(12) United States Patent
Shivnan

(10) Patent No.: US 7,903,544 B2
(45) Date of Patent: Mar. 8, 2011

(54) PRIVATE NETWORK LINK VERIFICATION PROCEDURE IN FREE SPACE OPTICAL COMMUNICATION NETWORK

(75) Inventor: Aine Shivnan, Olivenhain, CA (US)

(73) Assignee: Kiribati Wireless Ventures, LLC, Las Vegas, NV (US)

( * ) Notice: Subject to any disclaimer, the term of this patent is extended or adjusted under 35 U.S.C. 154(b) by 441 days.

(21) Appl. No.: 11/445,737

(22) Filed: Jun. 1, 2006

(65) Prior Publication Data

US 2006/0227794 A1  Oct. 12, 2006

Related U.S. Application Data

(62) Division of application No. 09/949,221, filed on Sep. 7, 2001, now Pat. No. 7,079,551.

(60) Provisional application No. 60/238,326, filed on Oct. 5, 2000.

(51) Int. Cl.
*H04L 12/26* (2006.01)

(52) U.S. Cl. .................................. 370/218; 370/244

(58) Field of Classification Search .......... 370/216–228, 370/241–245, 248
See application file for complete search history.

(56) References Cited

U.S. PATENT DOCUMENTS

| | | | |
|---|---|---|---|
| 4,882,774 A | 11/1989 | Grotzinger | |
| 5,023,873 A | 6/1991 | Stevenson et al. | |
| 5,517,519 A * | 5/1996 | Carbone et al. | 375/211 |
| 5,546,445 A | 8/1996 | Dennison et al. | |
| 5,675,574 A | 10/1997 | Norizuki et al. | |
| 5,786,923 A | 7/1998 | Doucet et al. | |
| 5,935,215 A | 8/1999 | Bell et al. | |
| 6,016,313 A | 1/2000 | Foster, Jr. et al. | |
| 6,049,593 A | 4/2000 | Acampora | |
| 6,065,073 A | 5/2000 | Booth | |
| 6,067,076 A * | 5/2000 | Hocker et al. | 345/158 |
| 6,208,620 B1 | 3/2001 | Sen et al. | |
| 6,209,039 B1 | 3/2001 | Albright et al. | |
| 6,222,821 B1 * | 4/2001 | Sees et al. | 370/227 |
| 6,239,888 B1 | 5/2001 | Willebrand | |
| 6,275,501 B1 | 8/2001 | Lucas et al. | |
| 6,404,865 B1 * | 6/2002 | Springer et al. | 379/114.14 |
| 6,452,927 B1 | 9/2002 | Rich | |
| 6,462,847 B2 | 10/2002 | Willebrand | |
| 6,480,472 B1 * | 11/2002 | Jou et al. | 370/252 |
| 6,535,489 B1 | 3/2003 | Merchant et al. | |
| 6,594,228 B1 | 7/2003 | Naidoo et al. | |
| 6,626,587 B1 * | 9/2003 | Marmur | 398/17 |
| 6,643,269 B1 | 11/2003 | Fan et al. | |
| 6,751,196 B1 | 6/2004 | Hulyalkar et al. | |

(Continued)

FOREIGN PATENT DOCUMENTS

WO  9749204  12/1997

(Continued)

OTHER PUBLICATIONS

Official Action in U.S. Appl. No. 11/445,996 dated Jul. 16, 2008, 10 pages.

(Continued)

*Primary Examiner* — Hong Cho

(57) ABSTRACT

A system and method for verifying the integrity of a communication link in a wireless optical communication network. The system and method include monitoring the communication link on at least two levels and enabling or disabling signaling over the communication link appropriately depending on events reported through the system.

43 Claims, 12 Drawing Sheets

U.S. PATENT DOCUMENTS

| | | | |
|---|---|---|---|
| 6,763,195 B1 | | 7/2004 | Willebrand |
| 6,768,720 B1 | | 7/2004 | Kamstra et al. |
| 6,795,450 B1 | | 9/2004 | Mills et al. |
| 6,826,146 B1 | | 11/2004 | Blenis et al. |
| 6,850,523 B1 | * | 2/2005 | Karr et al. ................. 370/395.21 |
| 6,865,149 B1 | * | 3/2005 | Kalman et al. ................. 370/225 |
| 6,868,237 B2 | | 3/2005 | Willebrand et al. |
| 6,868,461 B1 | | 3/2005 | Mirkhani et al. |
| 6,889,009 B2 | | 5/2005 | Willebrand |
| 6,898,177 B1 | | 5/2005 | Grenier et al. |
| 6,934,477 B2 | | 8/2005 | Willebrand |
| 6,970,417 B1 | * | 11/2005 | Doverspike et al. .......... 370/216 |
| 6,975,587 B1 | * | 12/2005 | Adamski et al. .............. 370/217 |
| 6,978,093 B2 | | 12/2005 | Clark |
| 7,079,551 B2 | * | 7/2006 | Shivnan ........................ 370/469 |
| 7,088,676 B1 | * | 8/2006 | Doverspike et al. .......... 370/227 |
| 7,177,951 B1 | | 2/2007 | Dykeman et al. |
| 7,227,837 B1 | * | 6/2007 | Bi et al. ........................ 370/217 |
| 7,274,869 B1 | * | 9/2007 | Pan .................................... 398/5 |
| 7,280,470 B2 | | 10/2007 | Shiragaki et al. |
| 2004/0057375 A1 | * | 3/2004 | Shiragaki et al. ............. 370/216 |

FOREIGN PATENT DOCUMENTS

WO  9820631  5/1998

OTHER PUBLICATIONS

Official Action in U.S. Appl. No. 11/445,996 dated Aug. 11, 2008, 13 pages.
Response to Official Action in U.S. Appl. No. 11/445,996 dated Aug. 11, 2008, mailed Nov. 11, 2008, 16 pages.
Official Action in U.S. Appl. No. 11/445,996 dated Jan. 21, 2009, 6 pages.
Response to Official Action in U.S. Appl. No. 11/445,996 dated Jan. 21, 2009, mailed Apr. 21, 2009, 14 pages.
Official Action in U.S. Appl. No. 11/445,996 dated Sep. 1, 2009, 14 pages.
Response to Official Action in U.S. Appl. No. 11/445,996 dated Sep. 1, 2009, mailed Dec. 21, 2009, 19 pages.
Official Action in U.S. Appl. No. 11/445,996 dated Mar. 10, 2010, 12 pages.
Response to Official Action in U.S. Appl. No. 11/445,996 dated Mar. 10, 2010, mailed Jun. 7, 2010, 20 pages.

* cited by examiner

PRIVATE NETWORK LINK VERIFICATION PROCEDURE IN FREE SPACE OPTICAL COMMUNICATION NETWORK

CROSS REFERENCE TO RELATED APPLICATION

This application is a divisional of U.S. application Ser. No. 09/949,221, filed Sep. 7, 2001, now U.S. Pat. No. 7,079,551 which claims priority to U.S. Provisional patent application 60/238,326 entitled "PNNI LINK VERIFICATION (PLV) PROCEDURE" and filed on Oct. 5, 2000. The disclosure of the above-described filed applications are hereby incorporated by reference in their entirety.

BACKGROUND OF THE INVENTION

1. Field of the Invention

The present invention relates generally to communication systems, and to a system and method for verifying a communication link for a communication network.

2. Description of the Related Art

Over the last several years there has been tremendous growth in the deployment of fiber-optic facilities by telecommunications carriers such as Regional Bell Operating Companies (RBOCs), cable carriers, and Competitive Local Exchange Carriers (CLECs). Deployment of these facilities along with the introduction of technologies such as OC-192 and Dense Wave Division Multiplexing (DWDM) has dramatically lowered the marginal cost of bandwidth over fiber optic.

Thus, as a result of this development, there is extensive bandwidth and communications capability in carriers' backbone networks. However, many homes and offices do not have a practical solution to interface to these backbone networks. Consequently, direct attachment of potential customers to these backbone networks remains very expensive.

Currently, there are two practical methods for directly attaching customers to backbone networks such as optical fiber networks. These are buried or aerial fiber interconnections and microwave connections. However, both of these methods incur significant up-front costs before any revenue can be realized. In the case of buried or aerial fiber, these costs are associated with obtaining rights-of-way for the cable runs, and installing the cable by burying or hanging. In the case of a microwave system, these up front costs come not only from the cost associated with the microwave repeater equipment, but also from the costs associated with obtaining rights to the suitable portion of the spectrum. Therefore, system developers and integrators have sought long and hard to find suitable solutions to this "last mile" problem.

There is a need in communication networks to verify the stability of a network. The new types of systems being developed to solve the last mile problem also require stability verification and raise new challenges to such verification through their use of new network elements and new technology.

SUMMARY OF THE INVENTION

A node for use in a freespace optical communication network, wherein the node comprises a plurality of node heads. Each node head comprises an optical receiver and an optical transmitter, and a node base. The node base is coupled with the plurality of node heads, and comprises a control processor and a data transport mechanism switch, wherein the switch is coupled to the control processor and said plurality of node heads. The control processor includes a link verification module for monitoring and verifying the status of a communication link between nodes in the network.

The control processor can further comprise a first state variable configured to indicate the status of a physical layer, a physical layer task configured to monitor the first state variable, and a physical layer interrupt service routine configured to control the physical layer task and report physical layer events to the link verification module. Also included in the control processor are a second state variable configured to indicate the status of a transceiver layer, a transceiver task configured to monitor the second state variable, a link maintenance protocol configured to receive reporting of transceiver events via the transceiver task, and a transceiver manager task module configured to report transceiver layer events to the link verification module.

A method for verifying the status of a communication link in a wireless communication network having a plurality of nodes with optical communication links therebetween, wherein the optical communication link is implemented using an optical receiver/transmitter pair, wherein the receiver/transmitter pair has a physical layer and a receiver/transmitter layer. The method comprises checking the status of the receiver/transmitter layer for changes in the status of the communication link at the receiver/transmitter layer. And if the checking results in a link-up status, then the method further comprises notifying a link verification module of the link up status, checking the status of the physical layer for stability via a physical layer link up procedure, and enabling network signaling over the communication link if the physical layer is stable. If, when checking the status of the receiver/transmitter layer results in a link down status the method further comprises notifying a link verification module of the link down status and disabling network signaling over the communication link.

A method for verifying the status of a communication link in a wireless communication network having a plurality of nodes with optical communication links therebetween, wherein the optical communication link is implemented using an optical receiver/transmitter pair, the receiver/transmitter pair having a physical layer and a receiver/transmitter layer, and wherein the physical layer comprises a plurality of physical layer devices. The method comprises checking the status of the physical layer of the communication link. If the checking results in a changed status, the method further comprises triggering an interrupt service routine, determining which physical layer device triggered the interrupt service routine, calling an appropriate physical layer device interrupt service routine, determining whether a link verification procedure is needed for the physical layer device, and initiating a link verification procedure for the changed status if the link verification procedure is needed. However, if the changed status for the physical layer is from UP to DOWN, the link verification procedure comprises setting a link verification status to down, and checking the status of the receiver/transmitter layer. If the status of the receiver/transmitter layer is UP, then the method further comprises checking the current state of the physical layer, and if the current state of said physical layer is UP, then the method includes checking the number of fluctuations in the state of said physical layer. If the number of fluctuations in the state of the physical layer is less than a specified tolerable amount, the method further comprises enabling network signaling over the communication link. However, if the status of the receiver/transmitter layer is down, the method further comprises disabling network signaling over said communication link.

The link verification procedure also comprises, if the current state of the physical layer is DOWN, checking the number of times the link verification task has been performed. If the number of times is less than a specified number allowed, then the method includes returning to setting a link verification status to down. Otherwise, if the number of times is more than a specified number allowed, then the task is stopped.

However, if the current state of the physical layer is UP, the link verification procedure further comprises checking the number of fluctuations in the state of the physical layer, and if the number of fluctuations in the state of the physical layer is more than a specified tolerable amount the link verification task is rescheduled.

BRIEF DESCRIPTION OF THE DRAWINGS

The present invention is described with reference to the accompanying drawings. In the drawings, like reference numbers indicate like elements.

DETAILED DESCRIPTION OF THE PREFERRED EMBODIMENT

Figure 1:
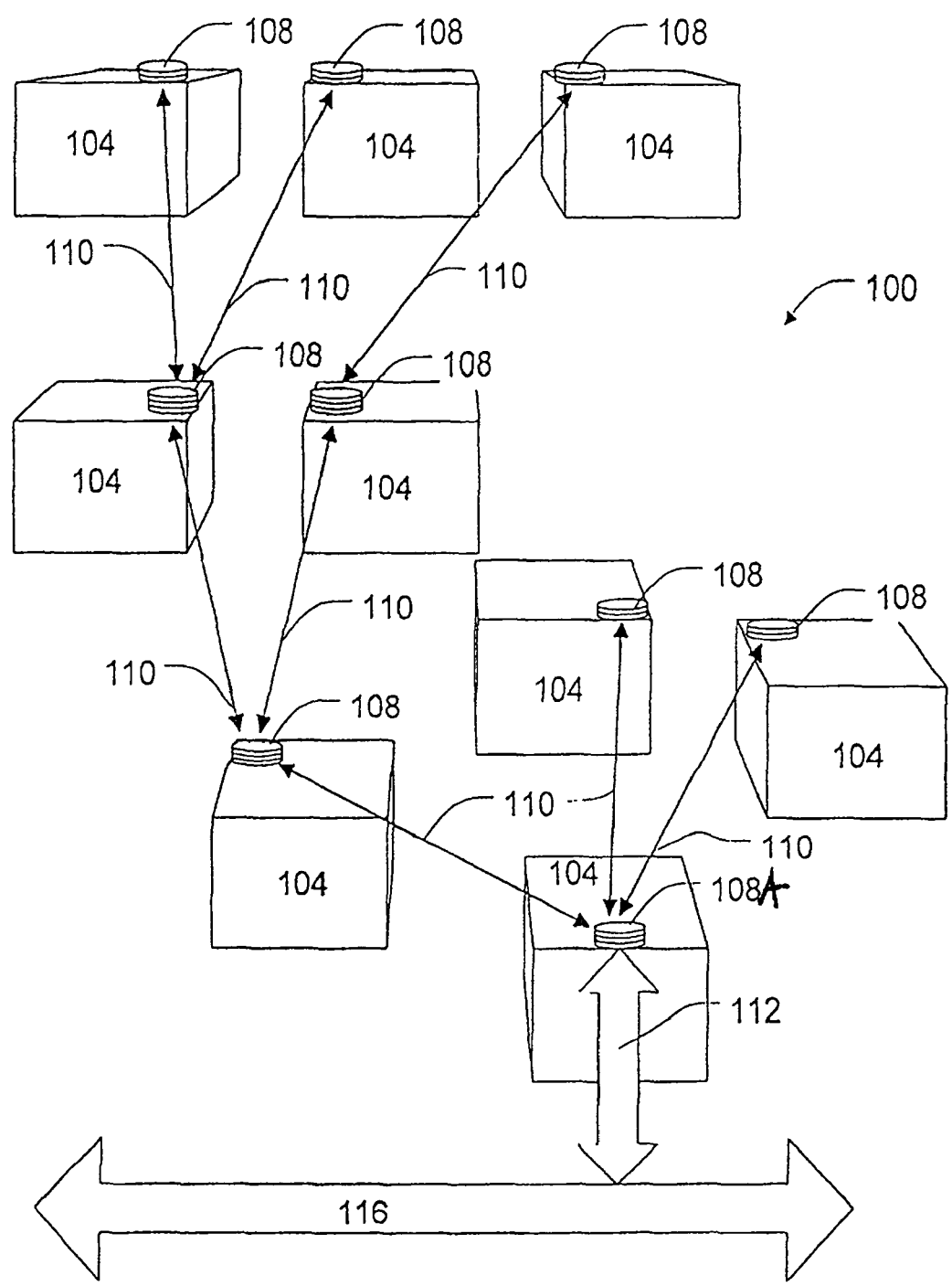
FIG. 1 is a diagram of an example communication network.

FIG. 1 is a diagram illustrating an example communication network 100. The communication network 100 illustrated in FIG. 1 can include a plurality of nodes 108, interconnected by communication links 110. The network nodes 108 are disposed on facilities 104. Although only one node 108 is provided per facility in the example illustrated in FIG. 1, more than one node 108 can be provided at one or more of facilities 104 depending on the communication requirements of the particular facility.

In exemplary embodiments of the network system, the facilities 104 can be buildings, towers, or other structures, premises, or locations. The facilities 104 can, for example, be homes or offices to which it is desirable to interface one or more backbone networks of one or more common carriers or service providers. In these embodiments, the network 100 can provide the interface between the facilities 104 and the backbone network.

The nodes 108 can be interconnected with one another by optical communication links 110. In this optical embodiment, the nodes 108 can include one or more optical transmitters and receivers to provide communication links 110 among the plurality of nodes 108. The nodes 108 can also be implemented such that the communication links 110 are radio frequency (RF) communication links. Additionally, the communication links 110 can be a combination of optical links and RF links. For example, each optical link can have a backup RF link for use in cases of failure of the optical link. Although the nodes 108 can be hardwired together, it is preferable that the communication links 110 be wireless communication links to better facilitate interconnection of a variety of facilities 104.

The number of transmitters and receivers provided at a given node 108 can be varied depending on the fan-out capabilities desired at that node 108. However, in one embodiment, each node 108 has up to four transceivers, allowing each node 108 to connect its associated facility 104 with up to four additional nodes 108 at four additional facilities 104. The provision of both a receiver and transmitter (i.e., transceiver) for each fan out of the node 108 allows bi-directional communication among nodes 108.

In optical embodiments, transceivers at the nodes 108 can be implemented using, for example, lasers or light emitting diodes (LEDs) as the optical transmitters and charge-coupled devices (CCDs), photomultiplier tubes (PMTs), photodiode detectors (PDDs) or other photodetectors as the receivers. Transmitter and receiver technologies for one or more preferred optical embodiments are discussed further hereafter.

Although the network 100 illustrated in FIG. 1 is illustrated as a branching tree network structure, other network structures or geometry's, such as a point-to-point configuration, can be implemented. For example, a mesh network structure such as described in U.S. Pat. No. 6,049,593 to Acampora, hereby incorporated by reference, can be used.

The network 100 can be implemented and utilized to directly connect a plurality of customers in one or more facilities 104 to a high-capacity communication network 116. For example, the network 100 can be used to connect the plurality of customers to a communication network 116 such as a high bandwidth copper or fiber service provider or common-carrier network. Advantageously, network 100 can therefore allow customers to access a high data rate, high-bandwidth communication network 116 from their home, office or other facility 104, regardless of the existing connection capabilities within that facility. Thus, the network 100 can be implemented to avoid the need to cable the backbone network 116 over the "last mile" to each facility 104.

To accomplish this objective, at least one of the nodes 108 is designated as a root node 108A. The root node 108A includes additional functionality to interface the communication network 100 to the provider network 116 via another communication link 112.

A service provider can provide service to users in a plurality of facilities 104 by providing a signal to the root node 108A of the system through the communication link 112. In one embodiment, nodes 108 use the Asynchronous Transfer Mode (ATM) as the data transport mechanism. Although nodes 108 can use other transport mechanisms, in this embodiment the service provider provides data to the root node 108A as ATM cells. In this manner, node 108A does not have to perform a format translation. In alternative embodiments, format translation can be provided to allow flexibility. To provide ATM cells, the service provider can provide a pre-atomized concatenated signal, such as a Synchronous Optical Network (SONET) signal to the root node 108A via the provider network 116 and communication link 112.

Figure 2:
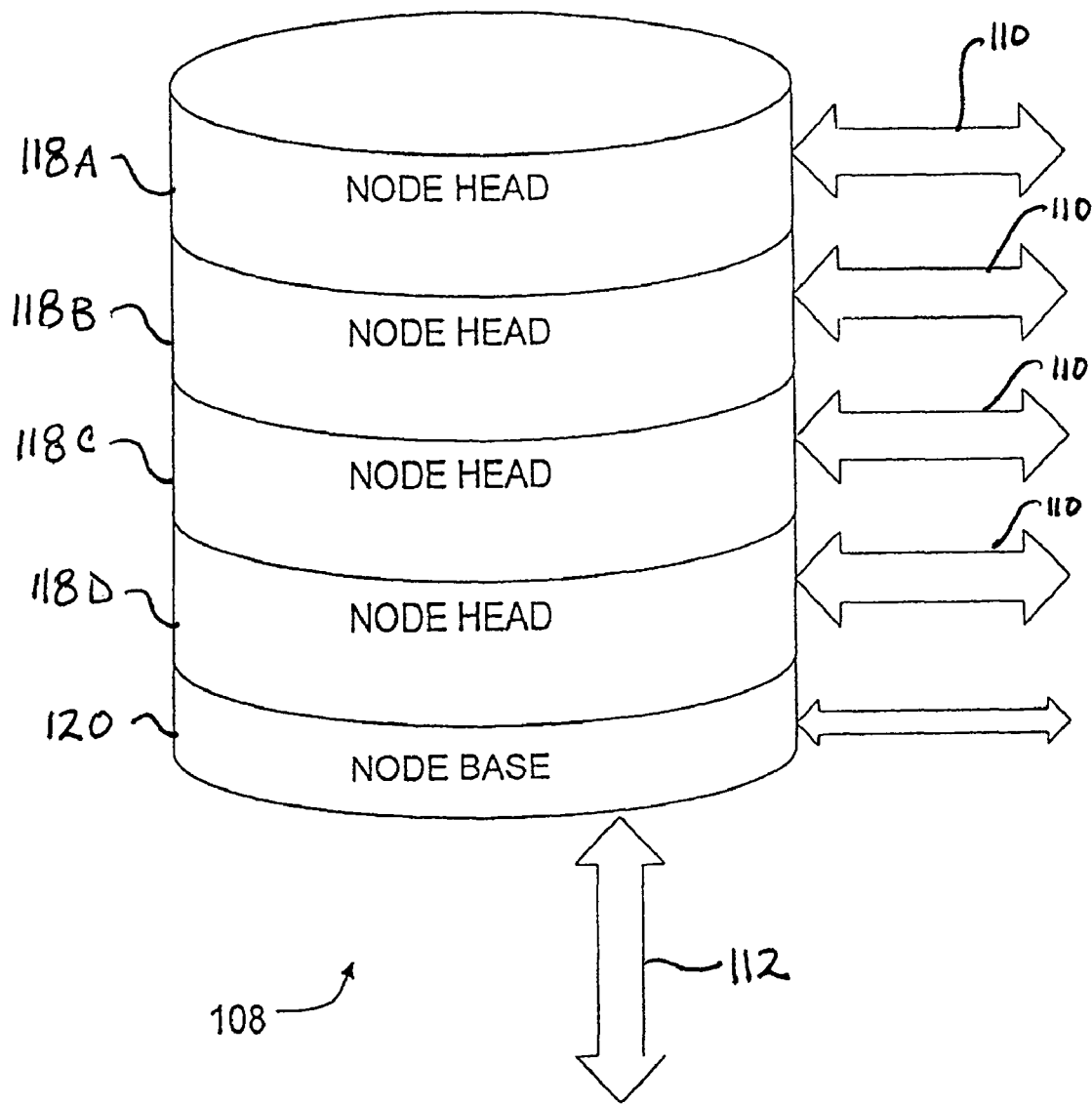
FIG. 2 is an illustration of a node.

FIG. 2 shows an exemplary embodiment of the node 108 comprising a node base 120 and up to four node heads 118A-

D, which are also referred to as wireless transceivers, or turrets. The node base 120 communicates with all four node heads 118A-118D along with the facility 104, and node heads 118A-118D communicate with other node heads 118 of additional nodes 108 via the communication links 110. As previously discussed, the communication links 110 can be any type of communication links, such as microwave or RF. Additionally, the node does not need to have a plurality of node heads or a node base separate from the node heads. The node may be comprised of a single component for receiving and transmitting a communication signal, and processing information.

Figure 3:
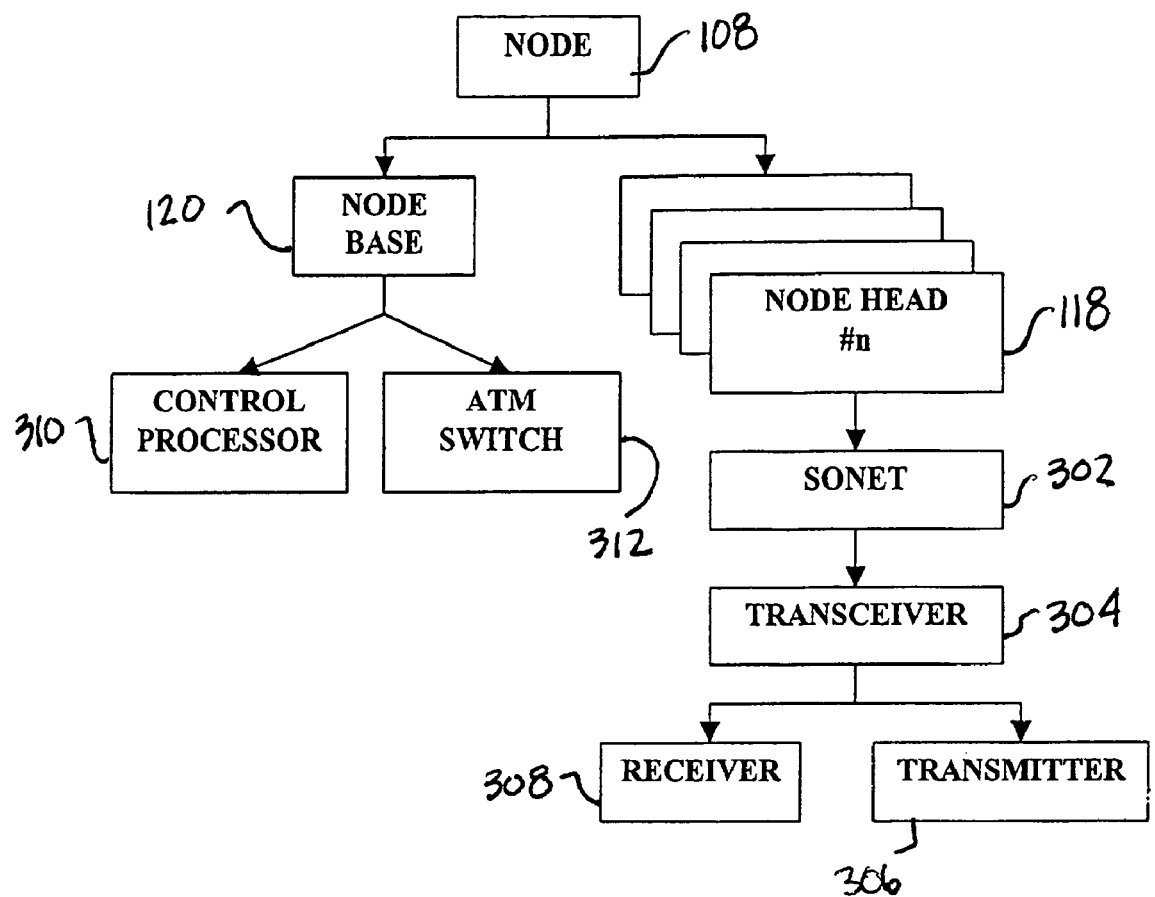
FIG. 3 is a block diagram of the hardware of the node of FIG. 2.

An exemplary block diagram of the node 108 is shown in FIG. 3. In the node base 120 there is a control processor 310 where the processing of data within the node 108 can be executed, and an ATM switch 312. The ATM switch 312 is an example of a data transport mechanism switch and it will be appreciated that other types of data switches or transport mechanisms such as TCP/IP can be used. Each node head 118 is comprised of a SONET component 302 with a transceiver 304. Each transceiver 304 comprises an optical transmitter 306 and receiver 308. The transceivers 304 can be transceivers for any type of communication link 110, or combination thereof in each node, such as microwave or RF, and are not limited to SONET components.

There are two levels in which the communication links 110 can be monitored within each node 108. The first is a physical level (PHY level) which, in this example consists of synchronous optical network (SONET) layers for each transceiver, and a switch, or ATM layer. In additional embodiments the SONET can be replaced with an ethernet, and/or the ATM switch replaced with an IP (Internet Protocol) stack. More generally, the first level is related to data transport. The second level that can be monitored is a turret level, including for example, a peer communication link communicating high level information concerning node operation from one node to another. More generally, the second level is related to the content of transported data. For example, it is at the second level that the node could detect that it is receiving a signal from the wrong source. The second level, comprising peer communication, is considered a higher priority level in the event of failure than the PHY level. It will be appreciated that the communication link 110 may only need monitoring at a single level, such as the PHY level, such that the single monitoring level can provide enough information about the integrity of the communication link to effectively monitor it.

Modules in the node 108, for example software running on control processor 310, maintain link state variables to track the state of the communication link 110 between adjacent nodes 108 at each level. The terms "module" or "task," as used herein, mean, but are not limited to, a software or hardware component, such as a FPGA or ASIC, which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented to execute on one or more computers.

Figures 4A, 4B:
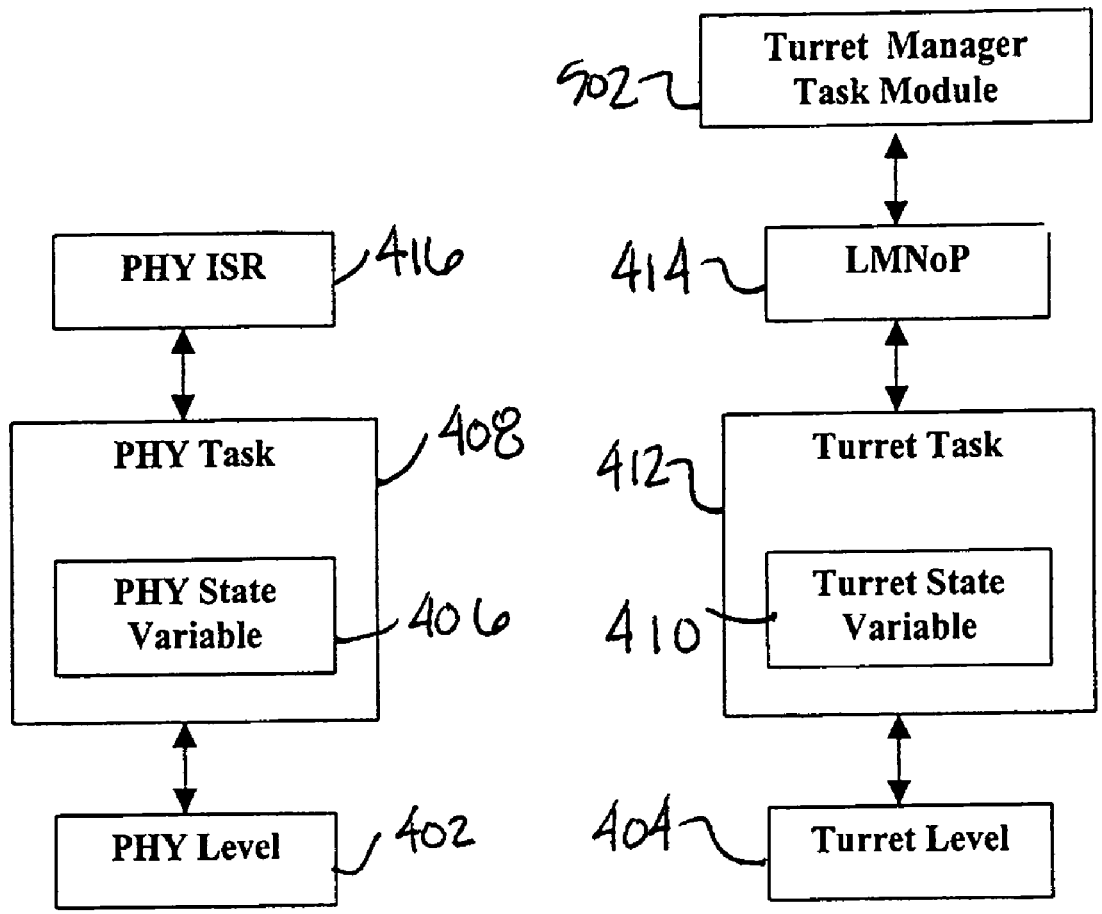
FIG. 4A is a block diagram illustrating the notification link to monitor the PHY level in a node.
FIG. 4B is a block diagram illustrating the notification link to monitor the turret level in a node.

Referring now to FIGS. 4A and 4B, the link state variables consist of the PHY link state variable 406, which indicates the state of the PHY level 402. The PHY link state variable is monitored by a PHY task 408. The PHY task 408 maintains the PHY link state variable 406 via an event and trap notification controlled by a PHY Interrupt Service Routine (ISR) 416. A turret link state variable 410 is monitored by a turret task 412, wherein the turret link state variable 410 indicates the state of the turret level 404. The turret task 412 maintains the turret link state variable 410 for each turret or node head 118 using information exchanged with the turret manager task module 502 via a Link Maintenance Node Protocol (LMNoP) 414.

Figure 5:
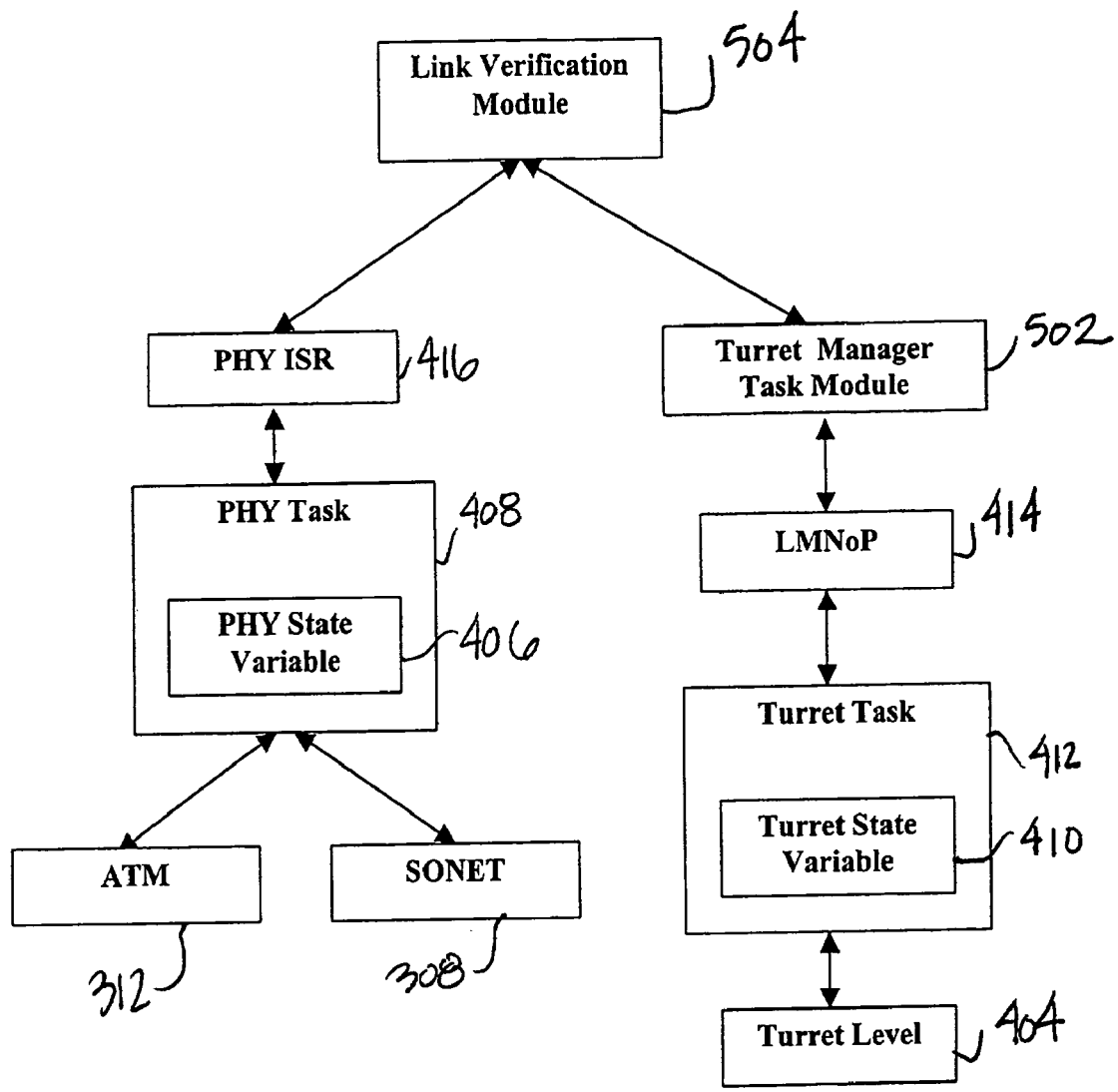
FIG. 5 is a block diagram illustrating the link verification mechanism.

The PHY level 402 and the turret level 404 differ in terms of verification time to determine the status of a communication link 110. In one embodiment, the PHY ISR mechanism immediately reports when there is any PHY level transition. The private network link verification (PLV) module fills the gap between the information managed by the turret task 412 and by the PHY task 408. As illustrated in FIG. 5, a PLV module 504 exchanges information with the PHY ISR 416 and the Turret Manager Task Module 502. The PLV module 504 can track reporting of PHY events via the PHY ISR 416 in areas of the node such as the SONET component 302 and the ATM switch 312. The PLV module 504 can track reporting of turret events via the Turret Manager task module 502 from the LMNoP 414, which exchanges information with the Turret layer 404. The PLV module 504 monitors PHY events and Turret events such that when either link state variable 406, 410, for each level 402, 404, is DOWN, signaling and user data traffic over the communication link 110 corresponding to the correct node head 118 is brought down. When both link state variables 406, 410 are UP, and the viability of the link has been established by the PLV task, the transfer of signaling and user data over the communication link 110 corresponding to the correct node head 118 is enabled. The process of network link verification for the PHY level 402 and the turret level 404 will be discussed in more detail further hereafter with reference to additional figures.

Figure 6:
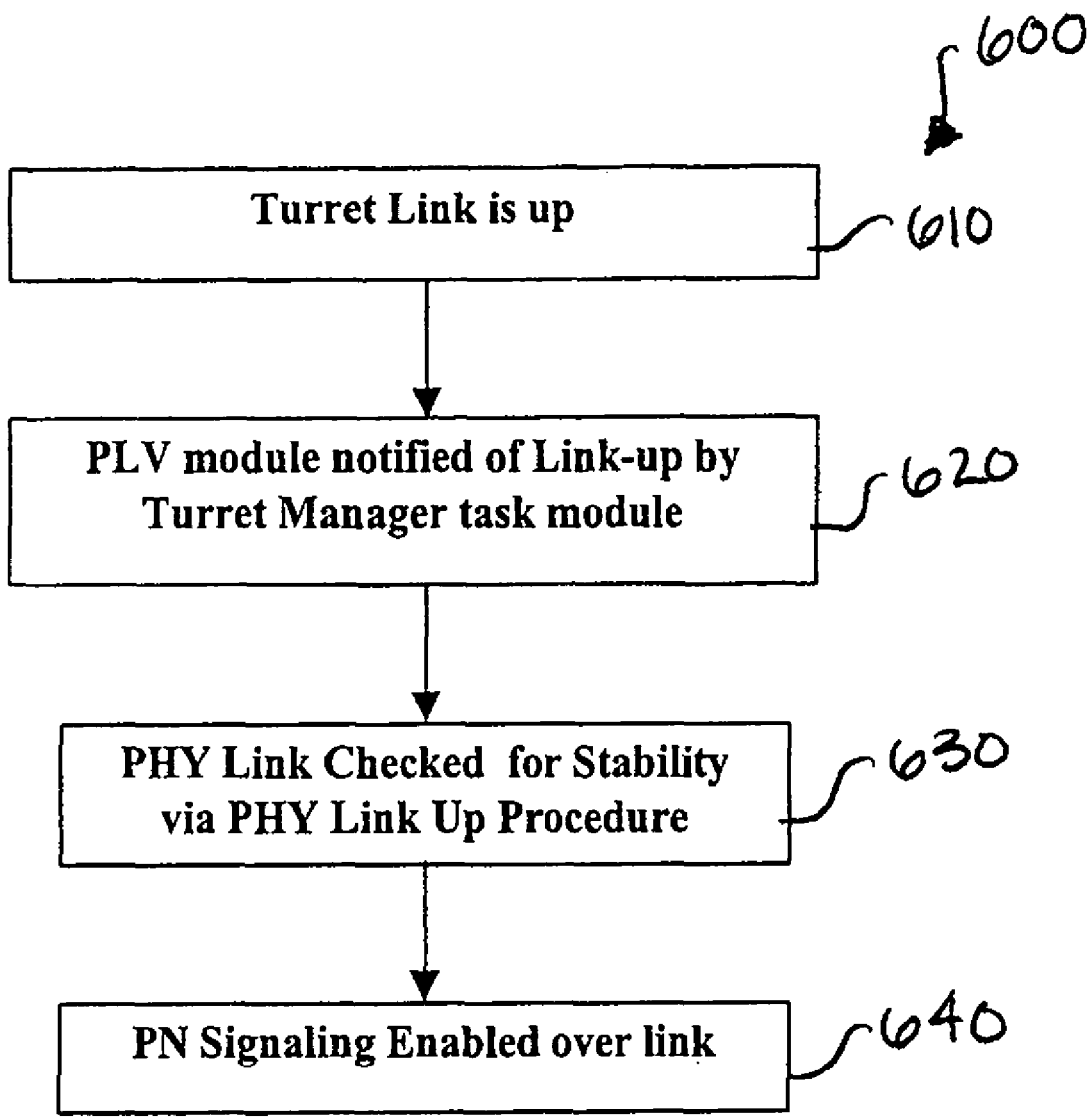
FIG. 6 is a flow diagram illustrating link activation via a turret link up event.

The flow diagram of FIG. 6 illustrates a turret link activation procedure 600 triggered by a turret link up event. When a link comes up over the turret, activated by a link up event 610 such as powering up the turret, in a step 620 the establishment of the link is communicated by the Turret Manager task module 502 to the PLV module 504. In a step 630 the PHY link is then checked for stability by the PLV PHY link up procedure discussed further hereafter. If the PHY link is verified as being stable, then in a step 640 network and ATM signaling is enabled over the link 110 that was initiated by the link up event.

Figure 7:
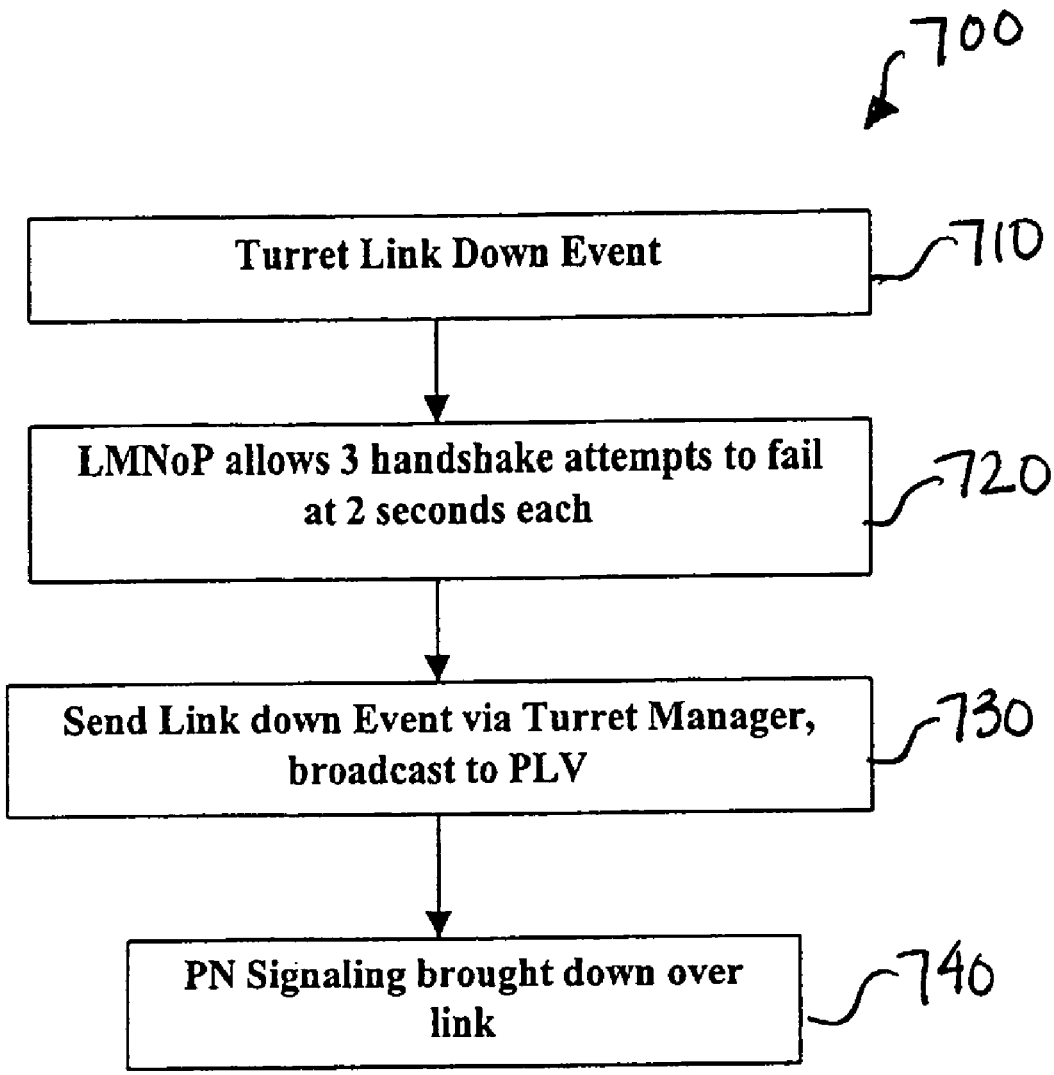
FIG. 7 is a flow diagram illustrating a turret link down procedure via a turret link down event.

The flow diagram of FIG. 7 illustrates a turret link down procedure 700 due to a turret link down event 710 such as loss in power or physical connection to the network 100. In a step 720, the LMNoP 414 allows for three hand shake attempts with the peer node with which the present node 108 desires a communication link 110. The three handshake attempts are allowed to fail before determining that the turret link has failed. Alternately, more or fewer attempts can be allowed. In one embodiment, the period of this handshake is every 2 seconds which allows a link to have failed for up to 6 seconds before a turret link state of DOWN is broadcast in a step 720 via the Turret Manager to the PLV mechanism as a Turret down event. In some cases, such as the detection of a reflected signal which will be discussed further hereafter, the handshake attempts of step 720 can be bypassed. In a step 740 the PLV mechanism receives the turret link down event from the turret task 412 and brings down signaling over the communication link 110.

An additional example of a turret failure is an event when the signal received at the PHY level 402 is actually the transmitted signal from the same transceiver 304 or from a transceiver other than the intended target. In one embodiment, the PHY level 402 does not have the capability to recognize this type of failure, therefore it is monitored at the turret level. An embodiment of this detection done at the turret level 404 is via identifiers that are embedded within messages of the LMNoP 414 to indicate which transmitter 306 has sent the message. If the turret task 412 determines that this message is not from the intended target, the link 110 is deemed as having failed. Another example turret failure is the reception of data from a third, unexpected transmitter. This traffic again can be distinguished by the turret task 412 via identifiers, implemented in the LMNoP 414, specifying the node 108 or link 110 to which it is associated.

Figure 8:
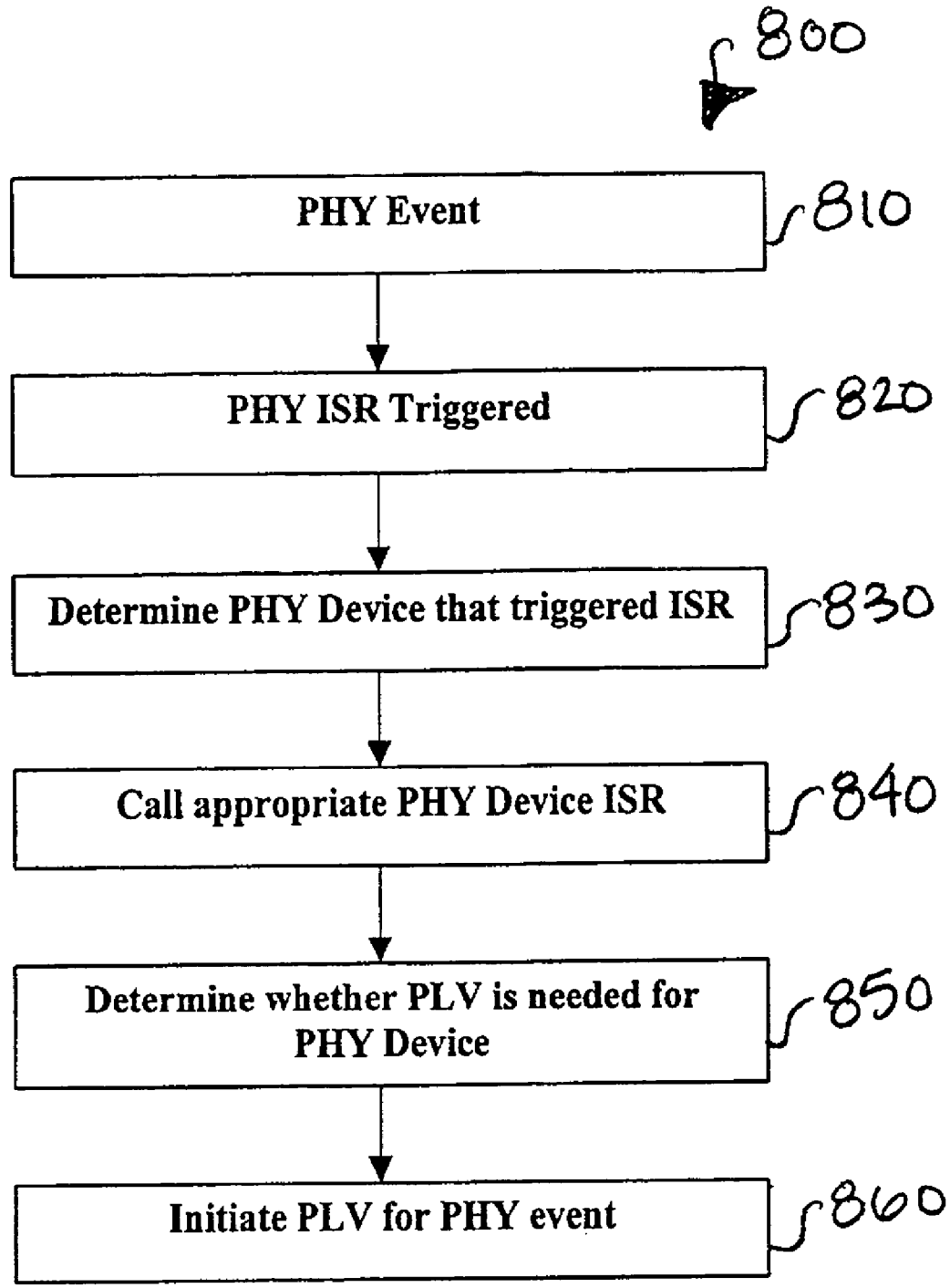
FIG. 8 is a flow diagram illustrating the execution of the PHY Interrupt Service Routine (ISR).

To monitor the PHY level 402 of the node 108 the PHY ISR 416 is used directly by the PLV module 504 in a PLV task as illustrated in FIG. 8. All the PHY levels (ATM and SONET) in a single node 108 trigger a single interrupt and interrupt routine 416. Alternatively, the ATM layer can trigger the ISR 416 through the SONET layer. In a step 810 a PHY event occurs followed by a step 820 in which the PHY ISR 416 is triggered. The PLV task is scheduled directly from this ISR. Events at the SONET level that can trigger the PHY ISR 416 include, but are not limited to, changes in the state of the SONET section, line, and path layer, along with various ATM conditions such as loss-of-cell delineation. When the PHY ISR 416 executes, in a step 830 it determines which device(s) triggered the interrupt followed by a step 840, which calls the appropriate device ISR. In a step 850 the device ISR will verify whether PN link verification is required for the particular link that triggered the ISR. If PN link verification is required, in a step 860 link verification is scheduled for the original PHY event 810.

PN link verification, performed by the PLV task, is scheduled either by the PHY ISR 416 or by a link up request for the purpose of PN communication. The PLV module 504 first checks the state of the PHY task 408 that initiated the PLV task. From the time the PLV task was originally scheduled it is possible the link 110 has been fluctuating, and thereby causing a number of interrupts to have occurred. The current state information of the PHY and Turret tasks 408, 412, and the interrupts caused by fluctuations in link 110 are used to determine the stability of link 110 and whether or not to bring PN signaling down or up over the link 110.

Figure 9:
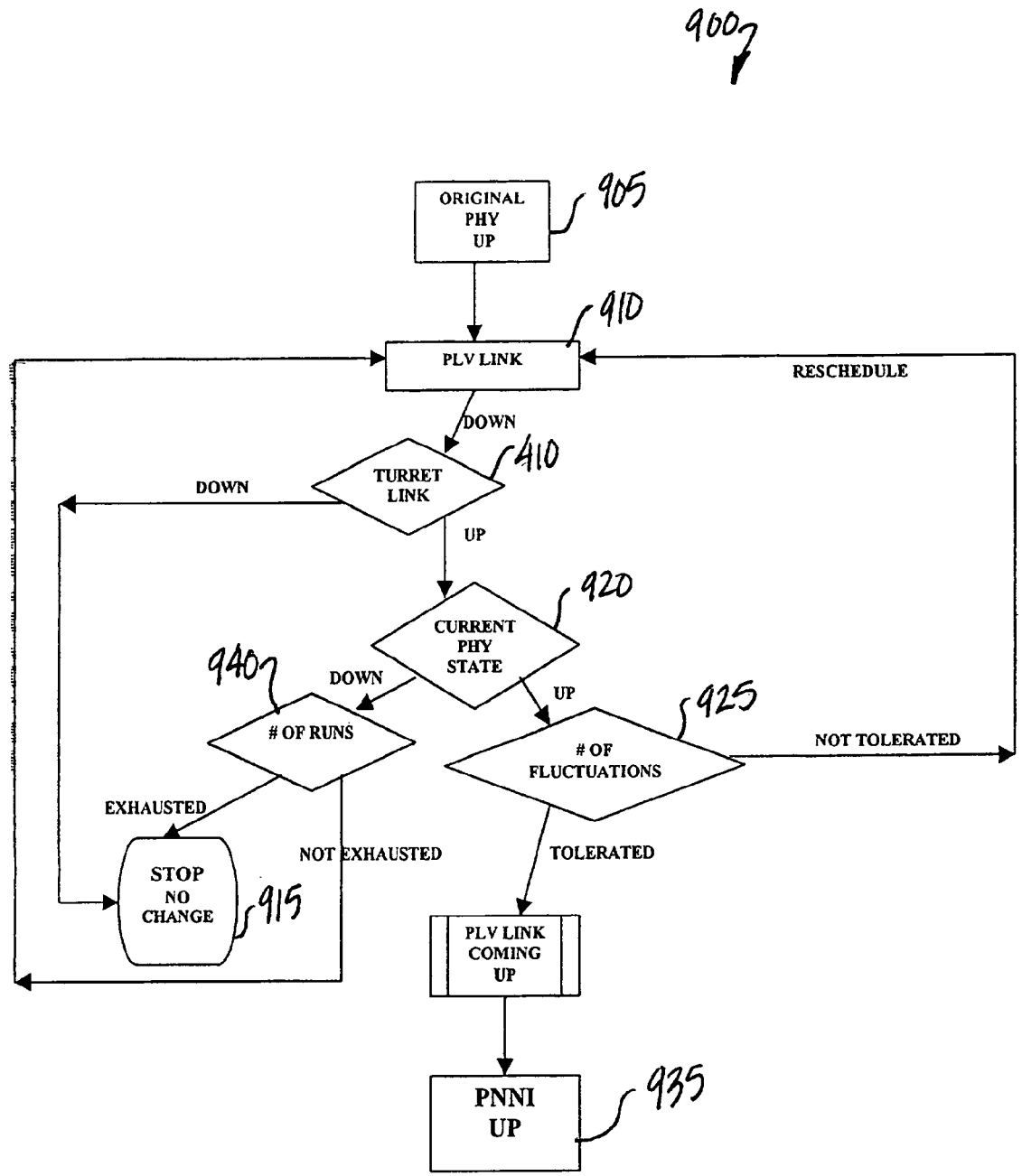
FIG. 9 is a state diagram illustrating PN link up verification for a PHY link up event.

A state diagram of a PN Link Up Verification task 900 is shown in FIG. 9. PN Link Up Verification 900 is typically scheduled when the original PHY state is changed to UP 905, changing the PLV link state 910 from IDLE to DOWN. If the Turret link state 410 is DOWN then the PLV link state is left DOWN and the PLV task stops 915. If the Turret link state is UP then the current PHY state 920 is polled.

If the current PHY state is UP then the number of fluctuations 925 (number of state transitions of the PHY link from the original link state which caused PLV to be scheduled) in the link is polled and compared with the number tolerable. The number of tolerable fluctuations is configurable and for this embodiment five fluctuations are allowed. If the number of fluctuations is below the acceptable amount tolerable the PLV link state 910 is COMING_UP and PN signaling is enabled 935 over the link. However, if the number of fluctuations in the link 925 exceeds the tolerable amount the PN Link Up Verification 900 task is rescheduled.

If the current PHY state 920 is DOWN for a Link Up Verification 900 then the number of runs 940 of the task for this link is examined and if the number of retries is exhausted then the PLV state 910 is left DOWN and the PLV task stops 915. If the number of runs 940 is not exhausted then the PN Link Up Verification task 900 is rescheduled.

Figure 10:
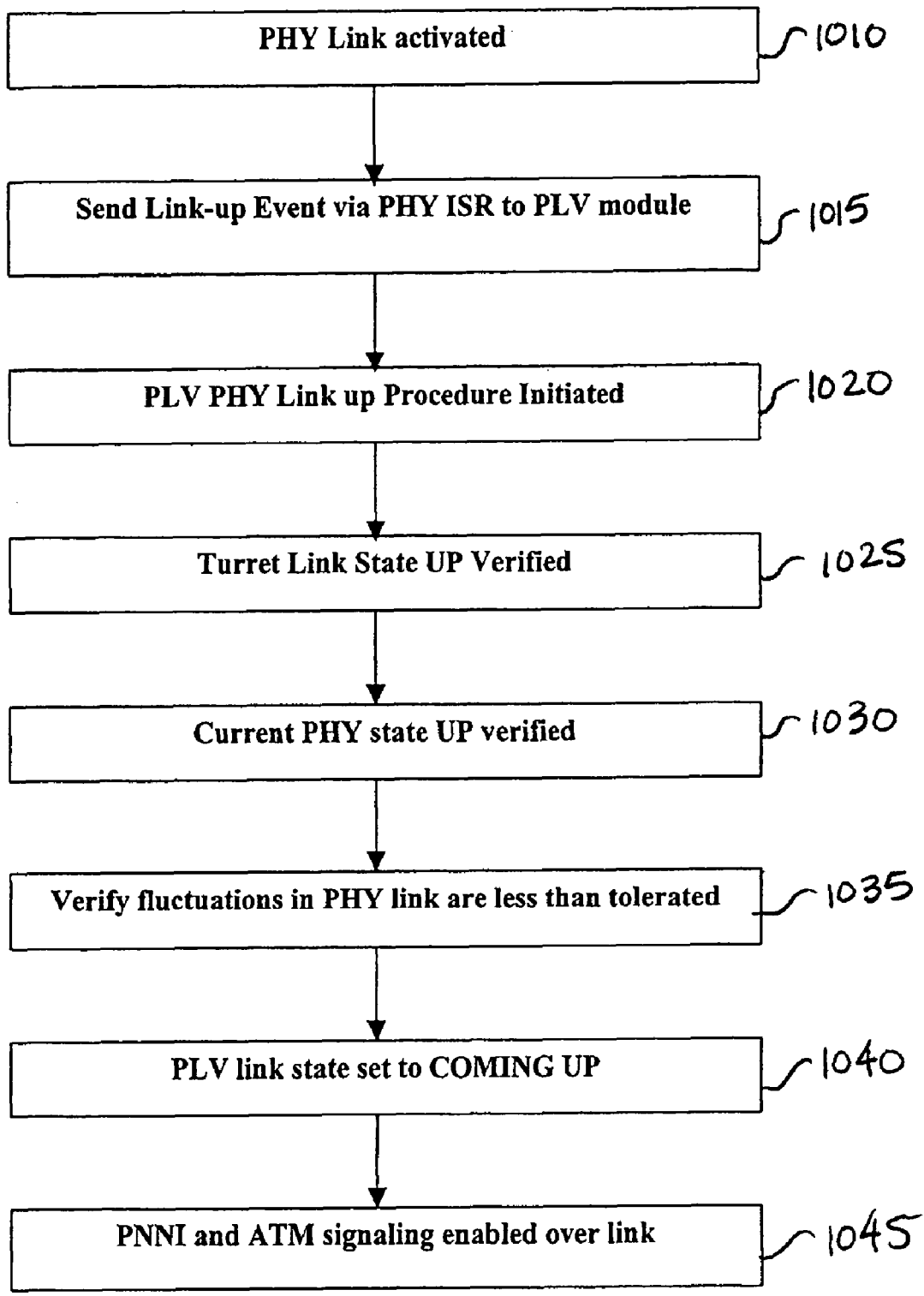
FIG. 10 is a flow diagram illustrating the process to enable network communication from a PHY link up event.

The flow diagram of FIG. 10 illustrates the steps used to enable PN link 110 communication from a PHY link up event. In a step 1010 a PHY link is activated, for example, following a link down event, followed by a step 1015 in which the Link up event is sent by the PHY ISR 416 via the PHY device driver to the PLV module. In a step 1020 the PN Link Up Verification 900 is initiated by the PHY ISR 416. In a step 1025 the turret link state 410 UP is verified either by the turret task 412 or directly by the PLV task 900, followed by a step 1030 in which the current PHY state 920 UP is verified by the PLV task 900. In a step 1035 the number of fluctuations 925 in the PHY link are verified by the PLV task 900 as being less than tolerable, followed by a step 1040 wherein the PLV task sets the PLV link state as COMING UP, and in a step 1045 PN and ATM signaling is enabled 935 over the link 110.

Figure 11:
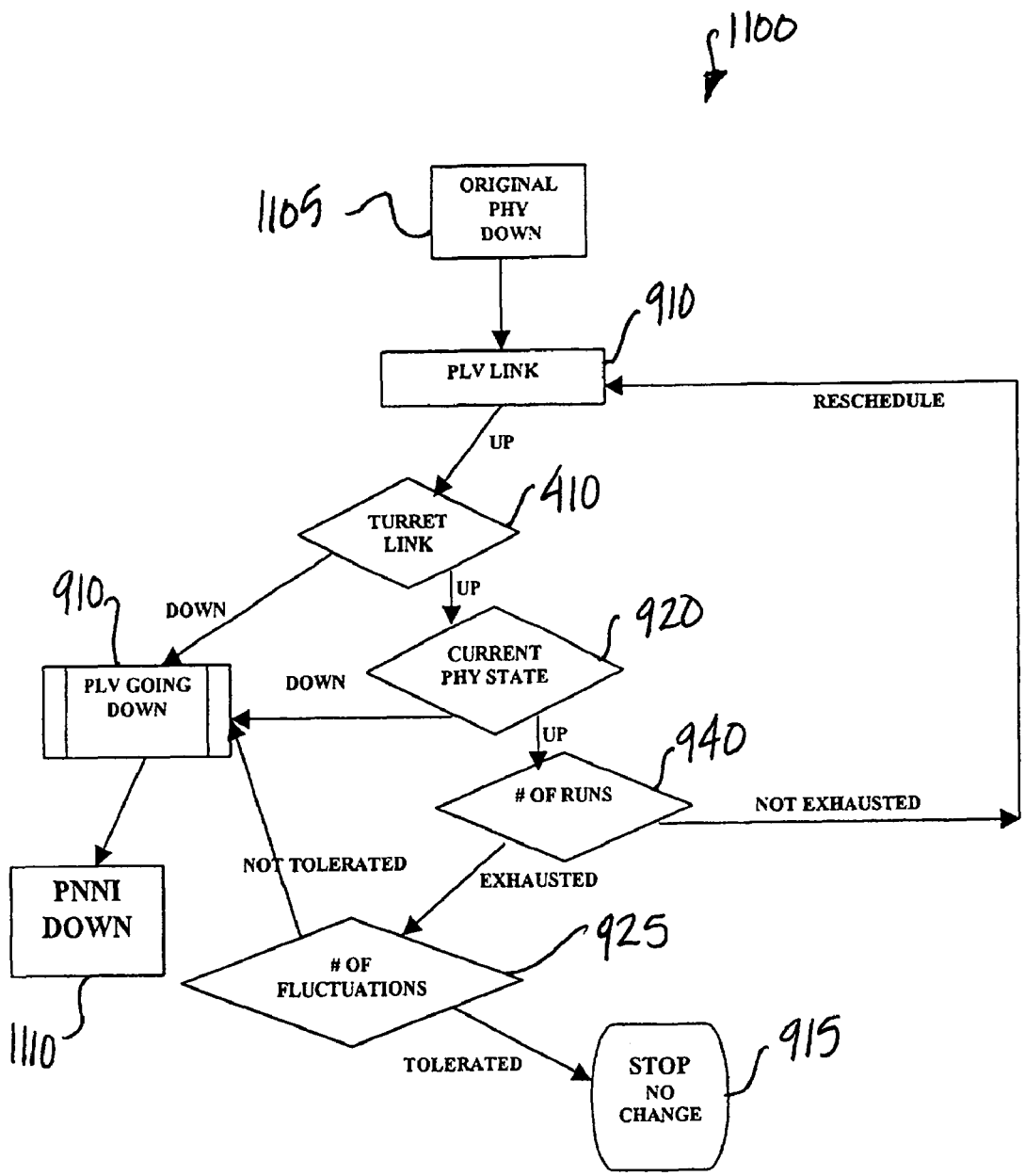
FIG. 11 is a state diagram illustrating network link down verification for a PHY link down event.

A state diagram of a PN Link Down Verification task 1100 is shown in FIG. 11. PN Link Down Verification 1100 is scheduled by the original PHY state DOWN 1105, changing the PLV link state 910 from IDLE to UP. If the Turret link state 410 is DOWN then the PLV link state 910 is GOING DOWN and the PN link 110 is brought down 1110. If the Turret link state 410 is UP then the current PHY state 920 is polled.

If the current PRY state 920 is UP then the number of runs 940 is polled by the PLV task 900, and if not exhausted, then the PN Link Down verification 950 is rescheduled. If the number of runs 940 is not exhausted then the number of fluctuations in the link 925 is polled by the PLV task 900 and compared with the number tolerable. If the number of fluctuations 925 is below the acceptable amount tolerable the PLV link state 910 is left UP and the PLV task stops 915. However, if the number of fluctuations in the link 925 exceeds the tolerable amount the PLV link state 910 is GOING-_DOWN and the PN link 110 is brought down 1110.

If the current PHY state 920 is DOWN then the PLV link state 910 is GOIN_DOWN and the PN link 110 is brought down 1110.

Figure 12:
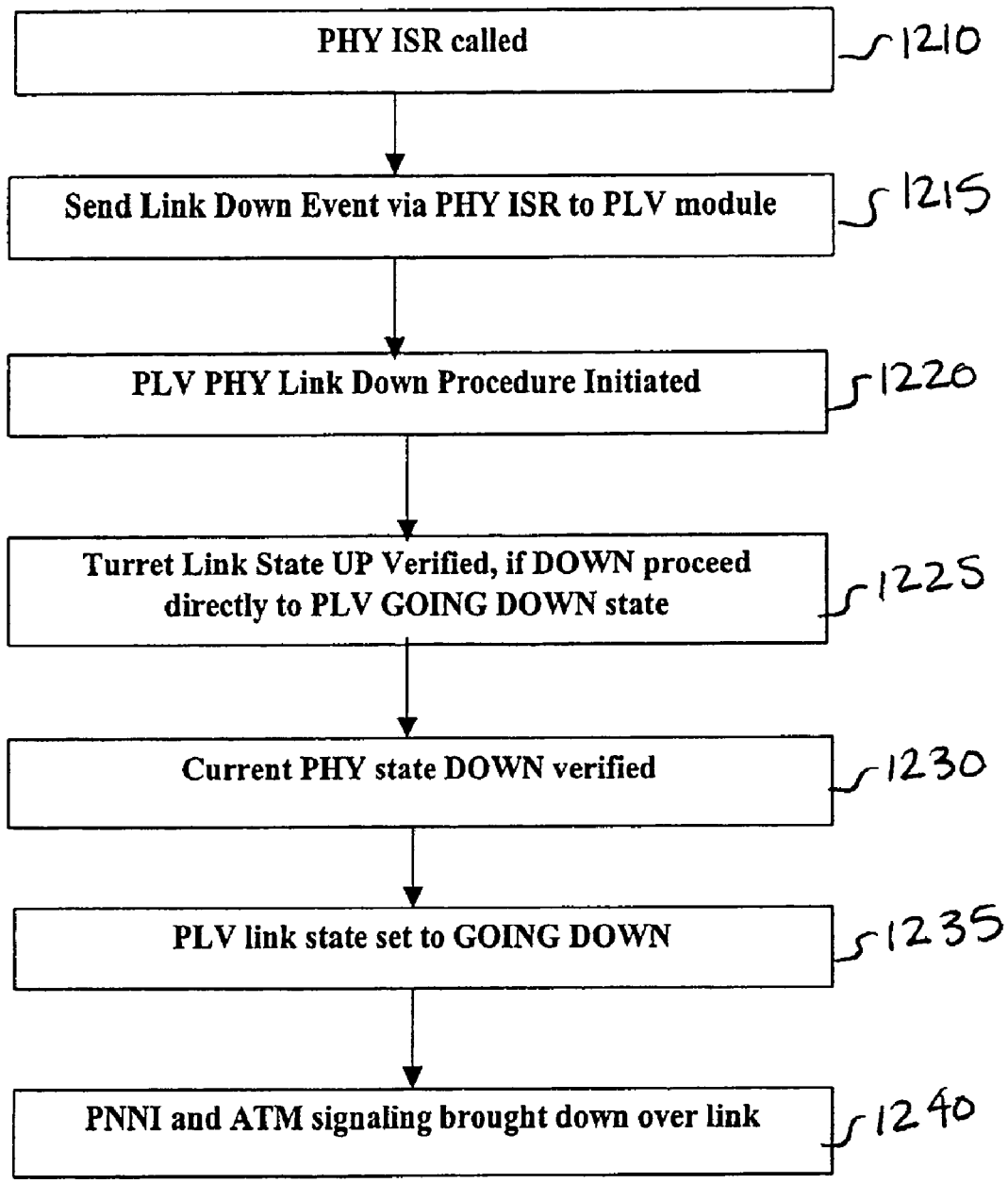
FIG. 12 is a flow diagram illustrating the process to disable network communication from a PHY link down event.

The flow diagram of FIG. 12 illustrates the steps used to bring down communication over the network link 110 from a PHY link down event. In a first step 1210 the PHY ISR 416 is called by an individual PHY component, followed by a step 1215 where a link down event is sent from the PHY ISR 416 to the PLV module 504. In a step 1220 the PLV link down procedure 950 is initiated by the PHY ISR 416. In a step 1225 the turret state 410 is verified UP from the turret task, however, if the turret state is DOWN, then the process proceeds directly to the PLV link state 910 GOING_DOWN. In a step 1230 the current PHY state 920 is verified DOWN by the PLV task, followed by a step 1235 where the PLV link state 910 is set to GOING_DOWN. The final step 1240 in the link down verification brings down PN and ATM signaling over link 110.

As previously discussed, in one embodiment, the PHY ISR mechanism immediately reports when there is any PHY level transition, allowing an embodiment where the PLV module could immediately determine that the link has failed and execute the appropriate steps. This embodiment, however, provides for a configurable time period to expire after a transition has been reported, after which the link status is verified, thus handling the case where minor signal fluctuations in the link would not constitute a permanent failure. At the turret level 404 after the turret state variable 410 has been initialized the turret task polls every two seconds to determine if its state has changed. This state is maintained by the periodic exchange of handshake information via LMNoP 414 over the turret link. In the case of a link failure of the turret communication link 404, the turret task allows for 3 LMNoP handshake attempts to fail before verifying that the link has failed. An example of a link failure that can only be verified by the turret task is one in which the turret communication link is "reflected" back on itself. At the PHY signal level the link will appear viable and PLV would not be engaged. LMNoP will examine identifiers within the protocol and determine that the link is being reflected and will change the state of the turret link variable accordingly. As previously discussed the turret level 404 is a higher priority to the node 108 than the PHY level 402 and therefore requires fewer handshake attempts to verify the status of the communication link at its particular level 404.

The handshake attempts and almost immediate indication of changes in the link states 406, 410 allow PLV to effect rapid detection of link interruptions and qualification of the interruptions as a failure in the link 110. Prior art methods of link failure detection and, more importantly, verification required 10-15 seconds to pass before a link failure was verified. The method disclosed herein greatly improves upon this failure time by reducing it to a configurable maximum for a link failure verification. Improvements in the link verification procedure may also be made by implementing the procedure using strictly hardware, or a combination of hardware and software, rather than using a method strictly employing the control processor as is described above.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A communication node, comprising:
   a network interface to a freespace optical communication link;
   a control processor coupled to said network interface and configured to monitor transmission of data over said freespace optical communication link;
   wherein said communication node is configured to disable transmission of data over said freespace optical communication link in response to detecting that a failure of said communication link lasts for a period of time longer than a first configurable timeout threshold associated with a first level of the communication link, wherein the first configurable timeout threshold is changeable; and
   wherein the communication node is configured to disable transmission of data over said freespace optical communication link in response to detecting that a failure of said communication link lasts for a period of time longer than a second configurable timeout threshold associated with a second, different level of the communication link, wherein the second configurable timeout threshold is changeable, wherein said detecting that a failure of said communication link lasts for a period of time longer than a second configurable threshold includes detecting that data is received from an incorrect source.

2. The communication node of claim 1, wherein said network interface includes an optical transceiver.

3. The communication node of claim 1, wherein said network interface includes a plurality of physical devices, and wherein said control processor is configured to monitor each of said plurality of physical devices.

4. The communication node of claim 1, wherein said communication node is configured to receive a value corresponding to said first configurable timeout threshold.

5. The communication node of claim 4, wherein said first level corresponds to a physical layer of said freespace optical communication link, and wherein monitoring of said second level is usable to detect a content error in data transmitted over said communication link.

6. The communication node of claim 5, wherein said communication node is configured to receive a value corresponding to the second configurable timeout threshold, wherein the second configurable timeout threshold is changeable.

7. The communication node of claim 5, wherein said first timeout threshold is different from said second timeout threshold.

8. The communication node of claim 1, wherein said first configurable timeout threshold is different from said second configurable timeout threshold, and wherein said first level corresponds to a physical layer of said freespace optical communication link.

9. A communication node, comprising:
   a plurality of node heads, each of which is coupled to a corresponding communication link, and wherein each corresponding communication link includes a physical level and a second level, and wherein at least one corresponding communication link is a freespace optical communication link; and
   a node base coupled to each of said plurality of node heads, wherein said node base includes a control processor configured to monitor said physical level and said second level of each corresponding communication link, wherein monitoring of said second level of each corresponding communication link is usable to detect a content error in data transmitted over said corresponding communication link;
   wherein said communication node is configured to disable transmission over a corresponding communication link based on detecting a failure of said physical level lasting a period of time longer than a first reconfigurable timeout threshold or a failure of said second level lasting a period of time longer than a second reconfigurable timeout threshold, wherein said detecting a failure of said second level includes detecting that data is received from an incorrect source.

10. The communication node of claim 9, wherein one of said plurality of node heads is coupled to a network backbone.

11. The communication node of claim 9, wherein said node base includes a data switch configured to route data between selected communication links coupled to said communication node.

12. The communication node of claim 9, wherein at least one corresponding communication link is a radio frequency link.

13. The communication node of claim 9, wherein at least one corresponding communication link is a microwave link.

14. A communication node, comprising:
   a network interface coupled to a communication link, wherein said communication link includes a freespace optical transmission path and a backup transmission path; amd
   a control processor coupled to said network interface and configured to monitor a first level and a second level of said communication link, wherein said first level is a physical level of said communication link, wherein said monitoring of said second level is usable to detect a content error in data transmitted over said communication link, wherein the content error includes said communication node receiving data transmitted from an incorrect source, and wherein said control processor is configured to detect a data transmission failure over said communication link via said freespace optical transmission path, wherein detection of said failure is based at least in part upon said monitoring of said first and second levels for a failure of the communication link lasting a period of time longer than a first configurable timeout threshold or a failure lasting a period of time longer than a second configurable timeout threshold, respectively, and wherein, in response to detecting said data transmission failure, said communication node is configured to transmit data over said communication link via said backup transmission path.

15. The communication node of claim 14, wherein said control processor is configured to detect said data transmission failure via said freespace optical transmission path when a failure condition on said freespace optical transmission path exceeds a configurable threshold.

16. The communication node of claim 15, wherein said backup transmission path is a radio frequency transmission path.

17. The communication node of claim 15, wherein said backup transmission path is a microwave transmission path.

18. The communication node of claim 15, wherein said backup transmission path is a wired transmission path.

19. The communication node of claim 14, wherein said control processor is configured to detect said data transmission failure by monitoring said physical level of the communication link and determining whether said data transmission failure lasts longer than the first configurable timeout threshold.

20. The communication node of claim 19, wherein said control processor is configured to detect said data transmission failure by monitoring said second level of the communication link and determining whether said data transmission failure lasts longer than the second configurable timeout threshold.

21. The communication node of claim 20, wherein said communication node is configured to receive data from a second communication node via said communication link, and wherein said data transmission failure is a content error, and wherein said content error includes said communication node receiving data transmitted from a node other than said second communication node.

22. The communication node of claim 14, wherein the control processor is configured to disable the freespace optical transmission path responsive to detecting a failure of the first level exceeding a first configurable timeout threshold or detecting a failure of the second level exceeding a second configurable timeout threshold.

23. A communication node coupled to a freespace optical communication link, wherein said communication node is configured to:
  monitor a physical level of said freespace optical communication link;
  monitor a second level of said freespace optical communication link, wherein monitoring of said second level is usable to detect a content error in data transmitted via said freespace optical communication link, wherein detecting a content error includes detecting that data is received from an incorrect source;
  enable transmission of data over said freespace optical communication link based at least in part on results of monitoring said physical level and said second level;
  disable transmission of data responsive to detecting a failure of said physical level lasting a time period longer than a first changeable timeout threshold; and
  disable transmission of data responsive to detecting a failure of said second level lasting a time period longer than a second changeable timeout threshold.

24. The communication node of claim 23, wherein said communication node is configured to enable transmission of data over said freespace optical communication link in response to determining that said physical level is stable and said second level is operational.

25. The communication node of claim 24, further comprising an optical device for transmitting data over said freespace communication link.

26. The communication node of claim 24, further comprising an optical device for receiving data over said freespace communication link.

27. The communication node of claim 24, further comprising an optical transceiver.

28. The communication node of claim 27, wherein said physical level further includes an Internet protocol-based data transport mechanism.

29. The communication node of claim 28, wherein said Internet protocol-based data transport mechanism is TCP/IP.

30. The communication node of claim 27, wherein said physical level further includes an Ethernet-based protocol.

31. The communication node of claim 24, wherein said second level is a turret level.

32. The communication node of claim 31,
  wherein said turret level includes an optical transceiver;
  wherein the turret level is configured to determine a source of an optical signal received via said freespace optical communication link; and
  wherein the detecting the failure of said second level includes detecting that the determined source is an incorrect source.

33. The communication node of claim 24, wherein the physical level includes a synchronous optical network layer.

34. The communication node of claim 33, wherein the physical level includes an asynchronous transfer mode layer.

35. An apparatus, comprising:
  first means for sending data over a freespace optical communication link, wherein said freespace optical communication link has a physical level and a second level;
  second means for receiving data from said freespace optical communication link; and
  third means for monitoring a status of the freespace optical communication link;
  wherein said third means is configured to monitor said physical level and said second level of said freespace optical communication link; and
  wherein said apparatus is configured to enable transmission of data over said communication link based at least in part on results of monitoring said physical level and said second level relative to a first reconfigurable timeout threshold and a second reconfigurable timeout threshold, respectively, wherein the first reconfigurable timeout threshold specifies a first time period, wherein the second reconfigurable timeout specifies a second time period, and wherein monitoring said second level includes determining whether data is received from an incorrect source.

36. The apparatus of claim 35, wherein said apparatus is configured to enable transmission of data over said communication link based on said third means determining said physical level to be stable and said third means determining said second level to be operational.

37. The apparatus of claim 35, wherein said apparatus is configured to disable transmission of data over said communication link in response to detecting a failure of said physical level exceeding the first reconfigurable timeout threshold during said monitoring.

38. The apparatus of claim 35, wherein said apparatus is configured to disable transmission of data over said communication link in response to detecting a failure of said second level exceeding the second reconfigurable timeout threshold during said monitoring.

39. An apparatus, comprising:
  first means for sending data over a freespace optical communication link and for receiving data from said freespace optical communication link, wherein said freespace optical communication link includes a physical level and a second level; and
  second means for monitoring a status of the freespace optical communication link, wherein said second means is configured to monitor said physical level and said second level of said freespace optical communication link;
  wherein said apparatus is configured to enable transmission of data over said communication link based at least in part on results of monitoring said physical level and said second level; and
  wherein said apparatus is configured to disable transmission of data over said communication link responsive to detecting a failure of said physical level or said second level exceeding a first configurable timeout threshold or a second configurable timeout threshold, respectively, and wherein said detecting a failure of said second level includes detecting that data is received from an incorrect source.

40. The apparatus of claim 39, wherein said apparatus is configured to enable transmission of data over said communication link based on said second means determining said physical level to be stable and said second means determining said second level to be operational.

41. A communication node, comprising:
  a network interface to a freespace optical communication link;
  a control processor coupled to said network interface and configured to monitor transmission of data over said freespace optical communication link;
  wherein said communication node is configured to disable transmission of data over said freespace optical communication link in response to detecting that a failure of said communication link lasts a time period that is longer than either a first timeout threshold associated with a physical level of the communication link or longer than a second timeout threshold associated with a second level of the communication link,
    wherein said detecting that a failure lasts a time period that is longer than a second timeout threshold includes detecting that data is received from an incorrect source.

42. The communication node of claim 41, wherein at least one of the first timeout threshold and second timeout threshold is changeable.

43. The communication node of claim 41, wherein the control processor is configured to monitor the physical level and the second level.

* * * * *

UNITED STATES PATENT AND TRADEMARK OFFICE
CERTIFICATE OF CORRECTION

| | | |
|---|---|---|
| PATENT NO. | : 7,903,544 B2 | Page 1 of 1 |
| APPLICATION NO. | : 11/445737 | |
| DATED | : March 8, 2011 | |
| INVENTOR(S) | : Shivnan | |

It is certified that error appears in the above-identified patent and that said Letters Patent is hereby corrected as shown below:

On the Title Page, item (54), under "Title", Line 2, delete "FREE SPACE" and insert -- FREESPACE --.

Column 1, line 2, delete "FREE SPACE" and insert -- FREESPACE --.

Column 9, line 42, in Claim 1, delete "link;" and insert -- link; and --.

Column 10, line 63, in Claim 14, delete "amd" and insert -- and --.

Column 14, line 11, in Claim 41, delete "link;" and insert -- link; and --.

Signed and Sealed this
Twenty-eighth Day of June, 2011

David J. Kappos
*Director of the United States Patent and Trademark Office*